UNITED STATES PATENT OFFICE.

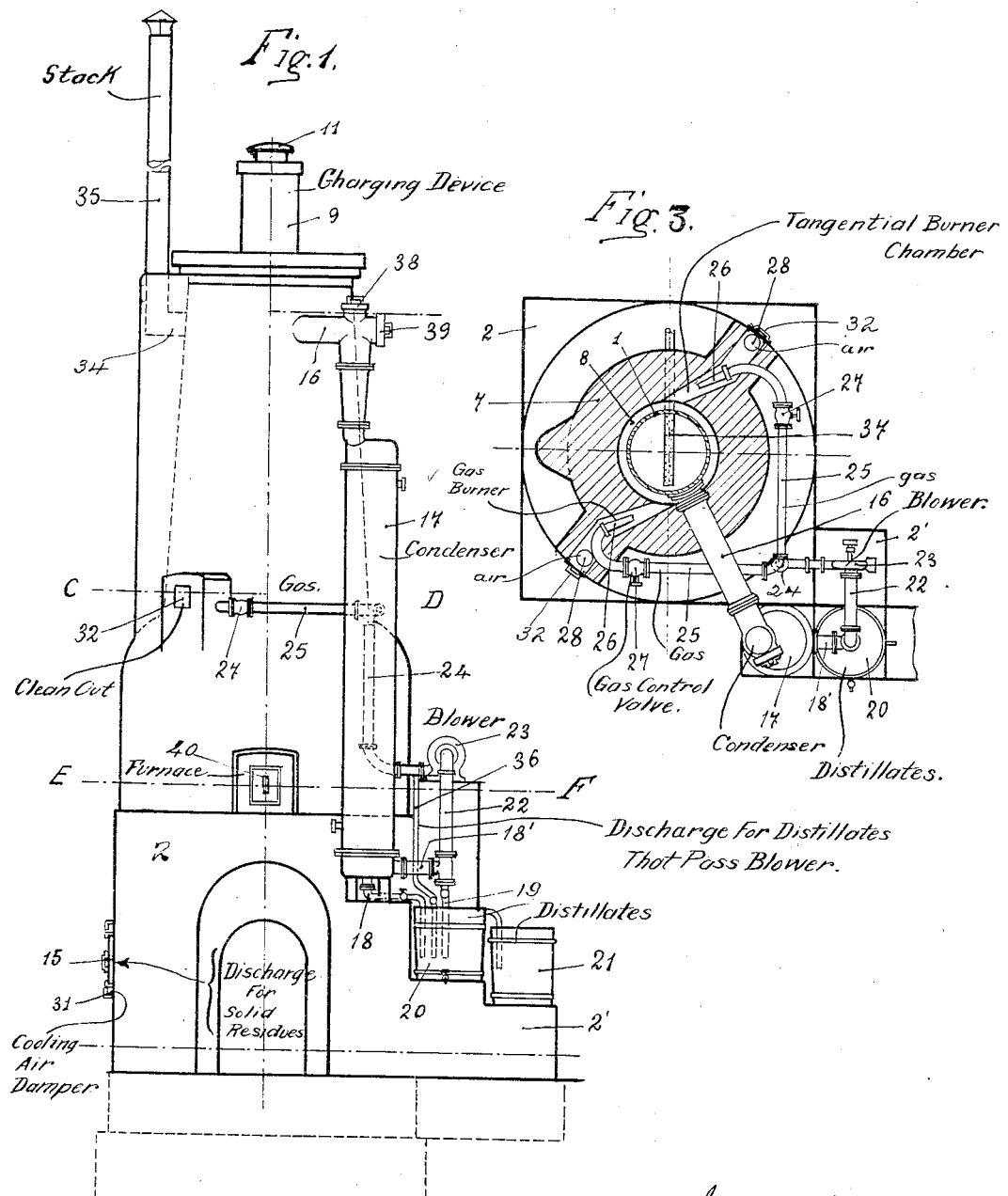

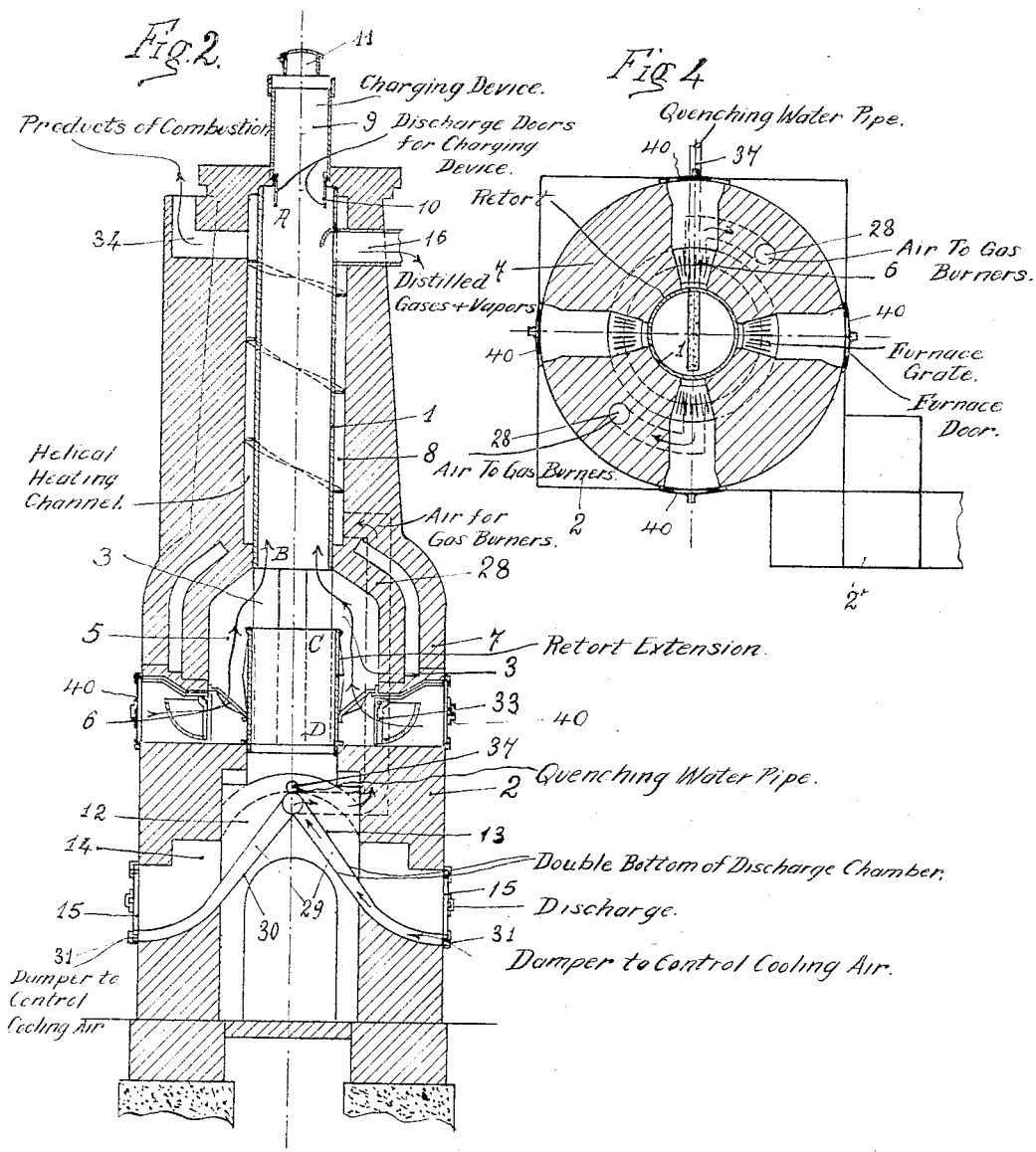

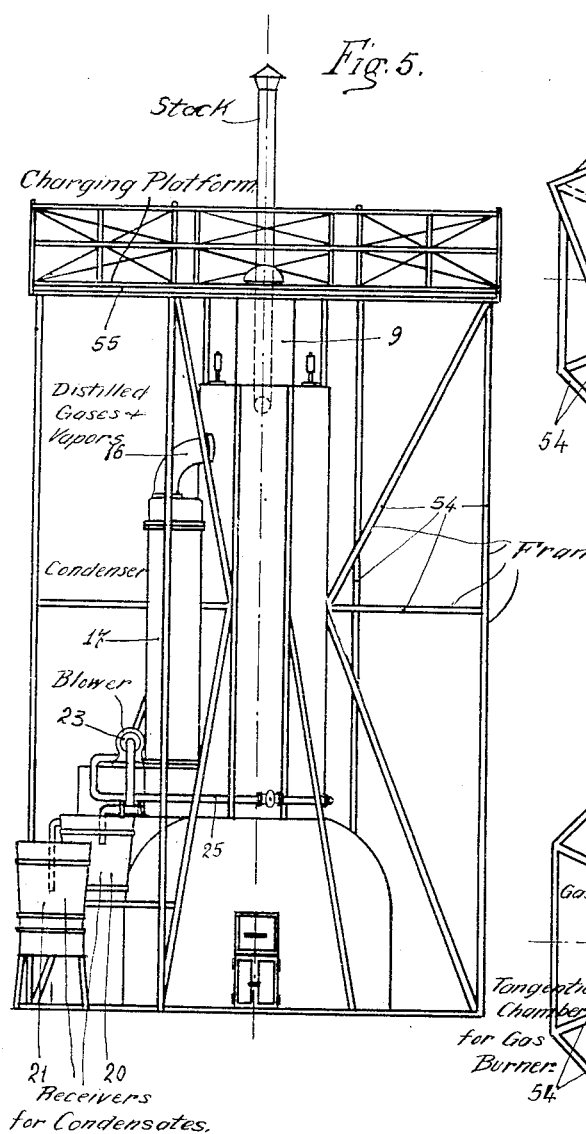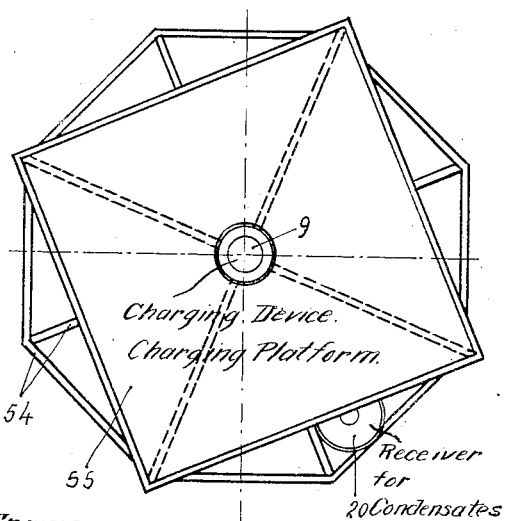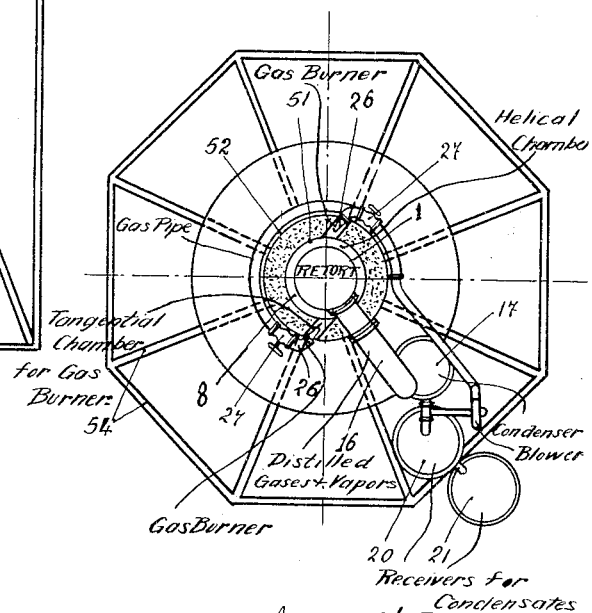

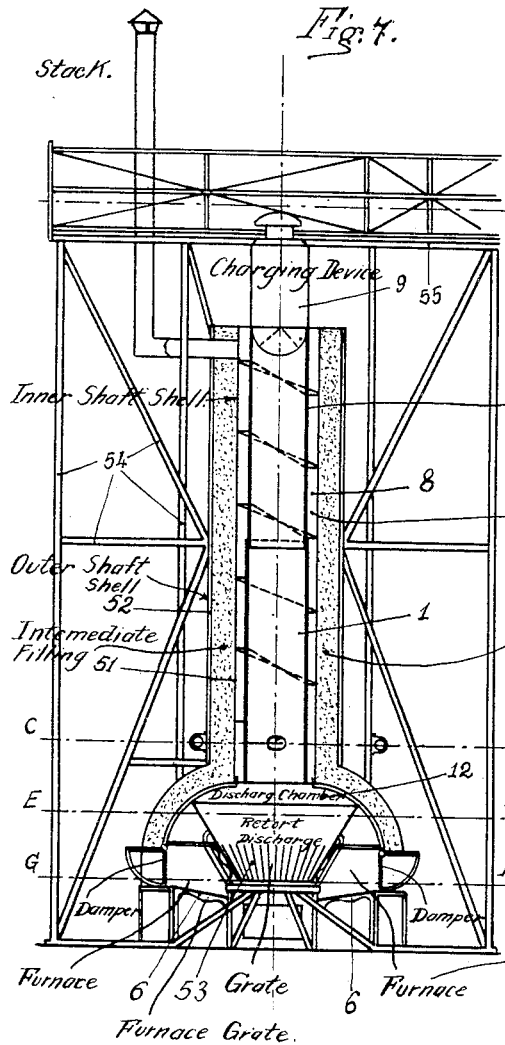
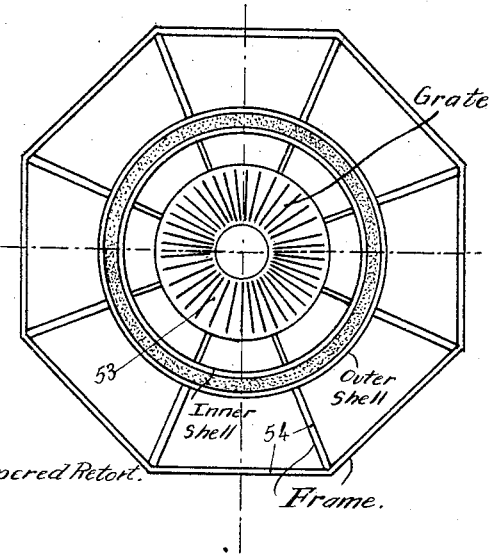
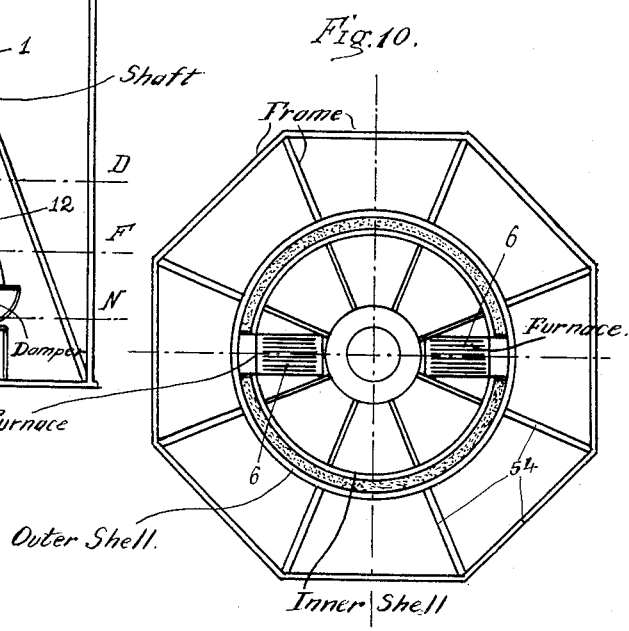

GIUSEPPE MAGRI, OF TURIN, ITALY.

APPARATUS FOR DISTILLING FUEL AND BITUMINOUS ROCKS.

1,399,267.  Specification of Letters Patent.  Patented Dec. 6, 1921.

Application filed January 21, 1919. Serial No. 272,333.

*To all whom it may concern:*

Be it known that I, GIUSEPPE MAGRI, residing at 27 Via Donati, Turin, in the Kingdom of Italy, have invented certain new and useful Improvements in Apparatus for Distilling Fuel and Bituminous Rocks; and I do hereby declare the following to be a full, clear, and exact description of the invention, such as will enable others skilled in the art to which it appertains to make and use the same.

My present invention has for its object an apparatus for distilling fuel and bituminous rocks for industrial purposes and is characterized by the fact that the fuel is distilled in a vertical retort provided with suitable inlet and outlet openings; the material gradually falls in said retort by force of gravity, and is carbonized in a continuous and systematic manner by causing it to pass through successively hopper regions, after which it is gradually cooled.

In many cases I use for said carbonization only the heat produced by burning the combustible gases obtained from the distillation, after they have been deprived of the condensable substances.

For starting the retort, when sufficiently rich materials are treated, or during the whole distillation for the treatment of poorer or damp materials, or when it is necessary to increase the heat of the retort, I use, besides the combustible gases produced during distillation, the heat produced by an inner reducing flame, for heating the charge, and enriched by air or water gas, obtained by means of suitable arrangements from the materials being treated. In other words, the retort works at given periods as a gas furnace.

The advantages obtained by this apparatus are as follows:

(*a*) A gradual and complete distillation of the materials is effected, and therefore there is a very little decomposition of the complex or heavy hydrocarbons into simpler hydrocarbons or hydrogen, the retort being in the best condition for utilizing the heat according to the principles of inverted currents; in this process the heat losses are reduced to a minimum.

(*b*) The apparatus is of a simple construction and operation and requires very little care and attendance, the condensers and all parts of the distillation retort being also very conveniently arranged.

(*c*) I obtain the greatest absolute output of coal and distilled products, the carbonization, (when the wood has been suitably dried or rich lignites, turf, and bituminous rocks are treated) being exclusively effected by noncondensing gases given off by the distillation, thus attaining the theoretic efficiency. This is not possible in other apparatus, where the output of coal is smaller, owing to the fuel required for externally heating the retorts or other distillation vessels.

(*d*) I obtain furthermore the greatest relative efficiency, as the continuity of the process allows distillation in a unit of time of the greatest quantity of material.

(*e*) The wood or other materials to be distilled may be treated at the place where the raw material is found even when of difficult access, the construction of the retorts being such that they may be easily erected, conveyed and reassembled, as it is very often necessary, for instance when it is required to distil wood in mountain places, or to treat at the mine poor fuel of bituminous rocks.

In the annexed drawing, Figures 1 to 4 show, by way of example, a constructional form of my distilling apparatus for wood, or other nonpulverizable and nonagglutinant fuel, for a stationary plant; and Figs. 5 to 10 show a constructional form of a transportable apparatus for treating bituminous rocks.

Fig. 1 is an elevation of the first constructional form;

Fig. 2 is an axial vertical section thereof on line A—B, Fig. 1;

Figs. 3 and 4 are two sections on lines C. D. and E. F., respectively, of Fig. 1;

Fig. 5 is an elevation of the second constructional form;

Fig. 6 is a plan view thereof;

Fig. 7 is an axial vertical section;

Figs. 8, 9 and 10 are horizontal cross sections on lines E. F., C. D., G. N., respectively, of Fig. 7.

Referring to Figs. 1 to 4, the apparatus comprises a vertical retort, formed by a metallic pipe 1, either cylindrical, or formed by a plurality of cylindrical parts of upwardly decreasing diameter as in Fig. 7 or conical as in Fig. 2 in order to facilitate the fall of the charge. The pipe portion B. C may be provided with wide openings 3, corresponding in number to furnaces 5, resting upon a base 2, or it may be broken away in the portion B. C, as shown; in this case, while the lower part of the portion A. B is connected to the brick work constituting the roofs of furnaces 5, the other shorter portion C. D (which is separated from the former by the distance B. C) rests on the brick base 2. About the portion C. D are thus formed sectors of annular spaces communicating with the grates, and into which part of the fuel contained in the retort falls, and is burnt when required producing a reducing flame in the retort, thus preventing the consumption of fuel in the retort and facilitating the distillation, but being richer in carbon monoxid, increases the heat efficiency and augments the volume of the non-condensable combustible gases produced by the distillation and utilized for externally heating said retort. The furnaces 5 provided with the grates 6 and hinged dampers 33 are located in the brickwork 7. This latter extends from the base 2 upward to form the roof or vault of the furnaces, then becomes narrower and surrounds the pipe 1 at B, then leaves it immediately free for an annular heating chamber 8, forming an upper furnace where the combustible non-condensable vapors produced by distillation are supplied in a spiral direction and burnt, thereby giving a distribution of the gasses around the retort with a small number of burners.

The gases of the incomplete combustion of the material on the furnace grates are drafted through the opening or openings at 3 into the upper part A—B of the retort chamber 1, assist the distillation therein and the entrainment of the products of distillation with which they mingle and are discharged through pipe 16.

At the upper part of the retort is provided a charging hopper 9 with a tilting bottom 10 operated from the outside, and with a tight fitting cover 11. The pipe 1 communicates at its lower part with a chamber 12, the bottom 13 of which is constituted by a metal sheet, inclined on both sides in order to allow of the discharge of the carbonized material through the conduits 14 provided in the base 2. The upper part of the conduits 14 is constituted by the step brickwork (as the upper part of the chamber 12, Fig. 2), and the bottom and sides are of metal sheet, ending with tight closing discharging doors 15.

Near the upper part of the retort is branched a pipe 16, conveying the distillation products into a condenser 17 wherefrom the condensed vapors are discharged below through a pipe 18, while some of the condensed products as well as the non-condensable products are discharged through a pipe $18^1$; the former are conveyed through pipes 18 and 19 and receiver 20 into the apparatus 21, and the latter, through pipe 22, are drawn by a suction member 23 into a pipe 24, wherefrom are branched two pipes 25, ending with burner nozzles 26, before which are placed two gas controlling valves 27. These nozzles are arranged in openings in the brick-work surrounding the retort at the bottom of the part A—B. The burner nozzles 26 force the combustible non-condensing distillation gases into the lower part of the annular furnace 8 in a tangential direction; here they are thoroughly mixed with the air required for combustion, arriving in correspondence to the combustion requirements of said nozzles through the pipes 28, provided in the brickwork 7, after passing along the metal sheet bottoms 13 of chambers 12 forming the bottom and sides of the fuel discharge conduits 14. Under said bottoms is provided, for said purpose, a free space 29, by applying a roof or a double bottom 30, from which spaces are branched pipes 28. The inlet of air from the atmosphere is controlled by sliding dampers 31, at the lower ends of the chambers 29 formed between the sheet-metal bottoms 13 and 29. I attain thus the purpose of cooling the material which has been carbonized during its final treatment before being discharged, heating at the same time the air for the combustion of combustible non-condensing vapors. The furnace waste gases 8 are discharged through pipe 34 and chimney 35. Near the nozzles 26 and at the outlet from the brickwork of pipe 16 discharging the distillation products are provided tight fitting doors 32, 38 and 39 for internal cleaning, another tight fitting door 40 is placed before the dampers 33 in order to totally prevent the inlet of air into the furnace after it has been started and the non-condensing distillation gases are produced in quantity sufficient for heating the retort.

In order to prevent tar or other condensing substances from collecting along the tubes 24 and 25 and entering the suction member 23, beyond this latter is provided a discharge pipe 36 that takes them away to the collector 20.

For the purpose of further cooling the fuel, a perforated tube may conveniently be placed on the top of the bottom 13, inclined at both sides, through which a finely subdivided jet of cold water is injected on the still very hot coal arriving on said bottom, conveniently enriching in water gas the non-condensable products to be burnt in the annular furnace 8.

All the condensing apparatus, as it is shown in Fig. 1, are so connected with the furnace as to be supported by the stepped extension $2^1$ of the base 2.

For larger plants, instead of a cylindrical retort, a retort having an elliptical or rectangular section may be used.

The distilling chamber 1 is first filled with material, wood, peat, bituminous rock or non-caking coal. Fires are built in the furnaces 5, which may immediately after lighting be drafted for a short while through the charging hopper 9, the cover 11 being left open for the purpose and plenty of air is admitted through 33. As soon as the fires are burning well, the centrifugal blower 23 is started, the dampers 33 so set that a reducing flame is produced by the fires, the top cover 11 is closed and the burner nozzles 26 are opened and ignited. The reducing flame from the furnaces 5 produces sufficient heat up through the body of material in the retort 1 to distil the contents, which as it descends in the retort supplies some of the outer portion to the furnaces 5 and automatically feeds them fuel. The hot gases from the furnaces 5, now mainly CO, rise through the distilling mass, carry with them condensable and non-condensable distillation products and are drawn through the pipe 16 and condenser 20 where the condensable products are retained, and the gases are drawn therefrom by the blower 23 and delivered to the burners 26.

As soon as distillation proceeds regularly, the fires in furnaces 5 may be extinguished and their draft openings tightly closed, whereupon the burners 26 will supply the heat necessary.

From time to time the discharging doors 15 are opened and the product, charcoal and the like, is removed, having first been quenched by a water spray from pipe 37, any water gas that is formed ascending through the charge and mingling with the distillation products, to be finally burnt at the nozzles 26. At the same time air admitted through dampers 31 passes through chambers 29' between double walls 13 and 29, becomes heated while cooling the coke and passes by pipe 28 to the recesses containing the nozzles 26 to supply combustion air.

The constructional form shown in Figs. 5 to 10 for distilling poorer materials, and particularly bituminous rocks has been designed for the dismountable type (which could of course be used also for the apparatus which has just been described). The apparatus illustrated in Figs. 5 to 10 consists of a tube 1, either conical, or formed by a plurality of cylindrical elements connected together, their diameter decreasing upwardly; external to said tube is the annular furnace 8 for the combustion of combustible non-condensable distillation gases. For the purpose of forming the external non-conducting wall of the furnace 8, two tubes 51, 52 coaxial with one another and with the tube 1 are provided, between them being placed a non-conducting substance, like ashes, kieselguhr, or the like.

The pipe 1 ends at its lower part in a chamber 12 having a bottom 53 which consists of a conical grate, its conicity being turned downward, opening at the center, and whose inclination depends on the different materials treated in the furnace. In two or more places under the grate 53, are placed auxiliary grates 6, where the fuel for starting and working the distillation apparatus is burnt. Suitable dampers control the combustion on the grate 6 and on the grate 53. The residue of the material which has undergone distillation burns on grate 53 and the distillation products escape through the upper part of the tube 1, as in the constructional form before described and, through the pipe 16, Fig. 9, where they enter the condenser 17; wherefrom the condensates are forced by the suction member 23 into the annular chamber 8 through nozzles 26. The charge is introduced through the hopper 9 and automatically discharged through the central hole of the grate bottom 53 of the chamber 12, under which it becomes packed and wherefrom it is gradually removed. In this apparatus cold water may be injected on the very hot material issuing from the central hole of the bottom 53 in order to produce water gas enriching the combustible vapors to be burnt in the furnace 8, or in order to facilitate the separation of the last hydrocarbons from the material.

As is clearly shown in the drawing, the whole apparatus is constituted by dismountable metallic parts, this rendering it very easy to transport said apparatus to several working places.

A metallic frame 54 supports the charging platform, where the charge may arrive, for instance, by means of a lift.

I claim:

1. In a distilling apparatus, a furnace, a distilling retort open at its bottom, said furnace arranged to draft through the retort, a quenching chamber below the retort also drafting therethrough, a spiral heating chamber exterior of said retort, a condenser into which said retort discharges volatile and gaseous products, a blower to induce the drafting of said quenching chamber, furnace and retort through said condenser and discharge non-condensable gases and means to burn said gases in said heating chamber.

2. In a fuel distilling apparatus, a plurality of furnaces, a retort supported on the roofs of said furnaces and open at its bottom, said furnaces arranged to draft through said retort, an axial continuation of said retort below the same also open at its bottom, an air-cooled chamber for receiving the discharge from said continuation, means for burning non-condensable gases on the exterior of said retort and means to conduct the air from said chamber to said burning means.

3. In a fuel distilling apparatus, furnaces, a distilling retort supported on the roof of said furnaces and open at the bottom, said furnaces arranged to draft through said retort, an axial extension of said retort also open at its bottom, a cooling chamber into which said extension discharges, and means to supply quenching water within said chamber, said chamber arranged to be drafted through said retort.

4. In a fuel distilling apparatus, a retort open at its bottom, furnaces surrounding said retort and drafting therethrough and supporting the retort, an extension below the retort receiving the material therefrom and open at its bottom, an inclined air-cooled chamber receiving the material from said extension, quenching means in the chamber, a spiral chamber surrounding the retort, nozzles tangentially directed in the bottom of said chamber and means to supply gases from the retort to said nozzles and combustion air from said cooling chamber.

In testimony whereof I affix my signature.

PROF. GIUSEPPE MAGRI.